(12) United States Patent
Oishi et al.

(10) Patent No.: US 12,426,535 B2
(45) Date of Patent: Sep. 30, 2025

(54) WORKING MACHINE AND BLADE UNIT

(71) Applicant: Makita Corporation, Anjo (JP)

(72) Inventors: Kohei Oishi, Anjo (JP); Takayoshi Iio, Anjo (JP); Tomoyuki Kutsuna, Anjo (JP); Satoshi Takahashi, Anjo (JP)

(73) Assignee: MAKITA CORPORATION, Anjo (JP)

( * ) Notice: Subject to any disclaimer, the term of this patent is extended or adjusted under 35 U.S.C. 154(b) by 324 days.

(21) Appl. No.: 18/178,581

(22) Filed: Mar. 6, 2023

(65) Prior Publication Data
US 2023/0284556 A1 Sep. 14, 2023

(30) Foreign Application Priority Data

Mar. 10, 2022 (JP) ................................. 2022-036919

(51) Int. Cl.
*A01D 34/17* (2006.01)
*A01D 34/10* (2006.01)
(Continued)

(52) U.S. Cl.
CPC ............. *A01D 34/17* (2013.01); *A01D 34/10* (2013.01); *A01D 34/145* (2013.01); *A01D 34/37* (2013.01); *A01G 3/053* (2013.01)

(58) Field of Classification Search
CPC ...... A01D 34/17; A01D 34/10; A01D 34/145; A01D 34/37
See application file for complete search history.

(56) References Cited

U.S. PATENT DOCUMENTS 3,973,378 A * 8/1976 Bartasevich ......... A01D 34/305
56/246
4,374,628 A * 2/1983 Boone .................... A01D 34/32
280/93.508
(Continued)

FOREIGN PATENT DOCUMENTS

JP 10-33062 A 2/1998
JP 2002-291338 A 10/2002
(Continued)

OTHER PUBLICATIONS

Communication issued Jul. 8, 2025 in Japanese Application No. 2022-036919.

*Primary Examiner* — Omar Flores Sanchez
(74) *Attorney, Agent, or Firm* — Sughrue Mion, PLLC

(57) ABSTRACT

A working machine may include: a first blade; a second blade overlapping with the first blade in an up-down direction; and a holding unit configured to hold the first blade and the second blade overlapping each other in the up-down direction. The first blade may be configured to reciprocate in a direction perpendicular to the up-down direction with respect to the second blade. The first blade may include a first elongated hole having a longitudinal direction along the reciprocating direction. The second blade may include a second elongated hole having a longitudinal direction along the reciprocating direction. The holding unit may include: a holding part inserted in the first elongated hole of the first blade and the second elongated hole of the second blade; and an outer sleeve having a cylindrical shape and supported by the holding part such that the outer sleeve is rotatable around the holding part.

11 Claims, 10 Drawing Sheets

(51) Int. Cl.
*A01D 34/14* (2006.01)
*A01D 34/37* (2006.01)
*A01G 3/053* (2006.01)

(56) References Cited

U.S. PATENT DOCUMENTS

| | | | | |
|---|---|---|---|---|
| 5,694,754 | A | * 12/1997 | Shuknecht | A01D 34/17 56/298 |
| 5,771,583 | A | 6/1998 | Kremsler et al. | |
| 6,116,010 | A | * 9/2000 | Salley | A01D 34/13 56/298 |
| 12,120,993 | B2 | * 10/2024 | Shimizu | A01G 3/04 |
| 2004/0112030 | A1 | * 6/2004 | Blakeslee | A01D 34/17 56/307 |
| 2007/0169599 | A1 | 7/2007 | Mace et al. | |
| 2020/0375117 | A1 | 12/2020 | Kitahara et al. | |
| 2021/0029887 | A1 | * 2/2021 | Shimizu | A01D 34/30 |
| 2024/0065145 | A1 | * 2/2024 | Wepfer | A01D 34/17 |

FOREIGN PATENT DOCUMENTS

| | | | |
|---|---|---|---|
| JP | 2003-23830 | A | 1/2003 |
| JP | 2016-049082 | A | 4/2016 |
| JP | 2020-191796 | A | 12/2020 |

\* cited by examiner

WORKING MACHINE AND BLADE UNIT

REFERENCE TO RELATED APPLICATIONS

This application claims priority to Japanese Patent Application No. 2022-036919, filed on Mar. 10, 2022, the entire contents of which are hereby incorporated by reference into the present application.

TECHNICAL FIELD

The disclosure herewith relates to a working machine and a blade unit.

BACKGROUND ART

Japanese Patent Application Publication No. 2016-49082 describes a working machine. The working machine includes a prime mover, a conversion mechanism configured to move in response to rotation of the prime mover, a first blade connected to the conversion mechanism, a second blade overlapping with the first blade in an up-down direction, and a holding unit configured to hold the first blade and the second blade overlapping each other in the up-down direction. The first blade is configured to reciprocate in a reciprocating direction perpendicular to the up-down direction with respect to the second blade when the conversion mechanism moves. The first blade includes a first elongated hole having a longitudinal direction along the reciprocating direction. The second blade includes a second elongated hole having a longitudinal direction along the reciprocating direction. The holding unit is inserted in the first elongated hole of the first blade and the second elongated hole of the second blade.

DESCRIPTION

In the working machine above, the holding unit becomes worn because it rubs against the first blade when the first blade reciprocates with respect to the second blade. The disclosure herein provides a technology that suppresses wear of a holding unit.

A working machine disclosed herein may comprise a prime mover; a conversion mechanism configured to move in response to rotation of the prime mover; a first blade connected to the conversion mechanism; a second blade overlapping with the first blade in an up-down direction; and a holding unit configured to hold the first blade and the second blade overlapping with each other in the up-down direction. The first blade may be configured to reciprocate in a reciprocating direction perpendicular to the up-down direction with respect to the second blade when the conversion mechanism moves. The first blade may include a first elongated hole having a longitudinal direction along the reciprocating direction. The second blade may include a second elongated hole having a longitudinal direction along the reciprocating direction. The holding unit may comprise: a holding part inserted in the first elongated hole of the first blade and the second elongated hole of the second blade; and an outer sleeve having a cylindrical shape and supported by the holding part such that the outer sleeve is rotatable around the holding part.

According to the configuration above, when the first blade reciprocates with respect to the second blade, the outer sleeve rotates around the holding part in response to the reciprocation of the first blade. This suppresses wear of the outer sleeve caused by it rubbing against the first blade.

A blade unit disclosed herein may be a blade unit to which a motion of a prime mover is transmitted via a conversion mechanism. The blade unit may comprise: a first blade connected to the conversion mechanism; a second blade overlapping with the first blade in an up-down direction; and a holding unit configured to hold the first blade and the second blade overlapping with each other in the up-down direction. The first blade may be configured to reciprocate in a reciprocating direction perpendicular to the up-down direction with respect to the second blade when the conversion mechanism moves in response to the motion of the prime mover. The first blade may include a first elongated hole having a longitudinal direction along the reciprocating direction. The second blade may include a second elongated hole having a longitudinal direction along the reciprocating direction. The holding unit comprises: a holding part inserted in the first elongated hole of the first blade and the second elongated hole of the second blade; and an outer sleeve having a cylindrical shape and supported by the holding part such that the outer sleeve is rotatable around the holding part.

According to the configuration above, the same effect as the one of the working machine above can be produced.

Figure 3:
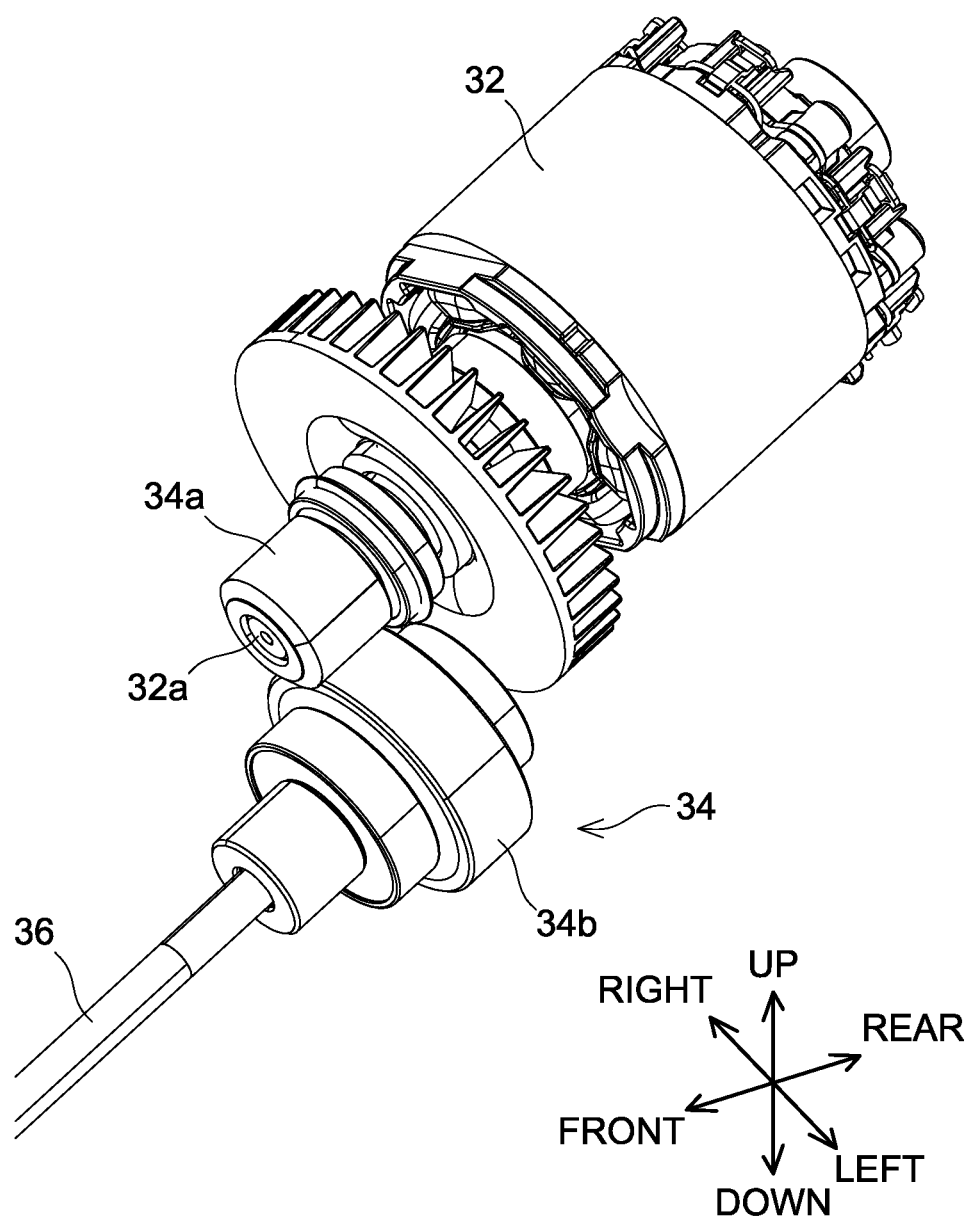

FIG. 3 is a perspective view of an electric motor 32 and a reduction mechanism 34 of the working machine 2 according to the first embodiment.

Figure 4:
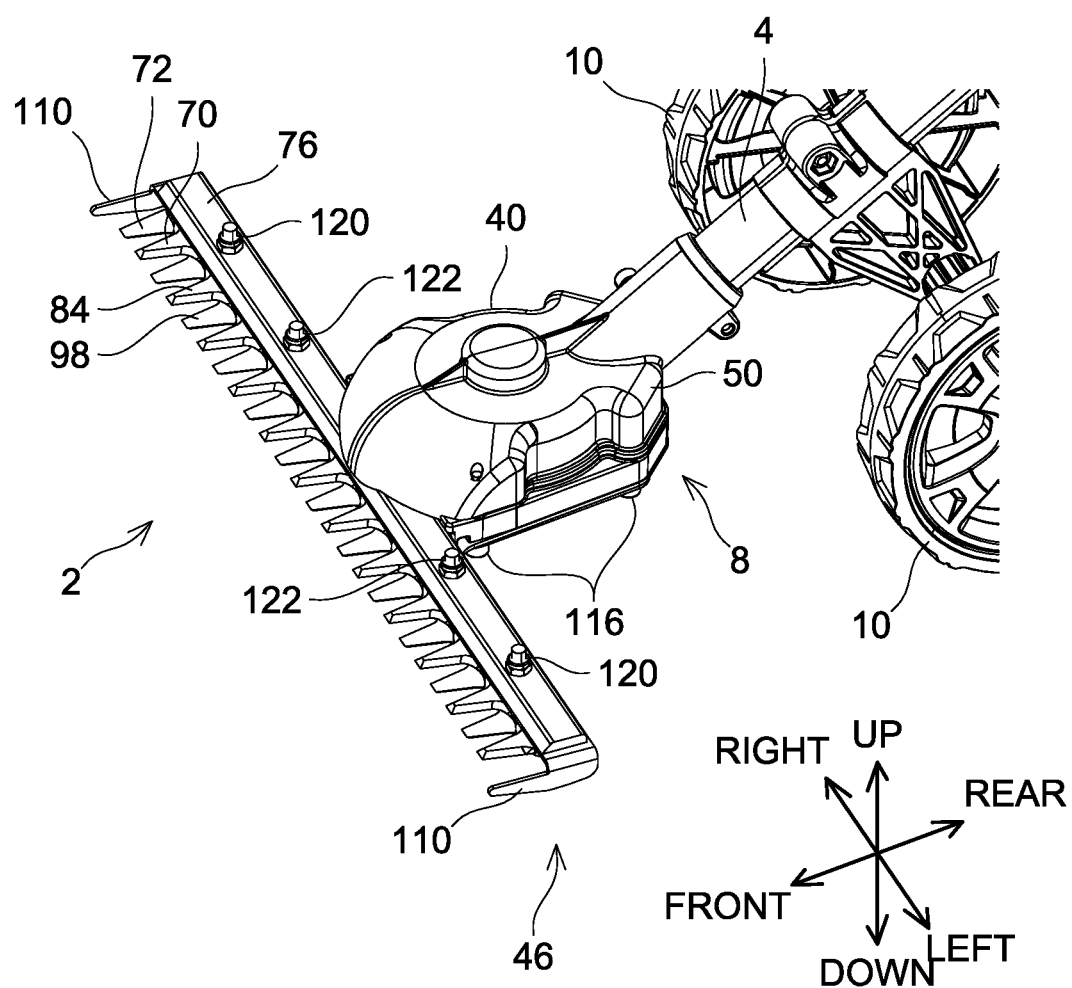

FIG. 4 is a perspective view of the working machine 2 according to the first embodiment, in the vicinity of a front end unit 8.

Figure 5:
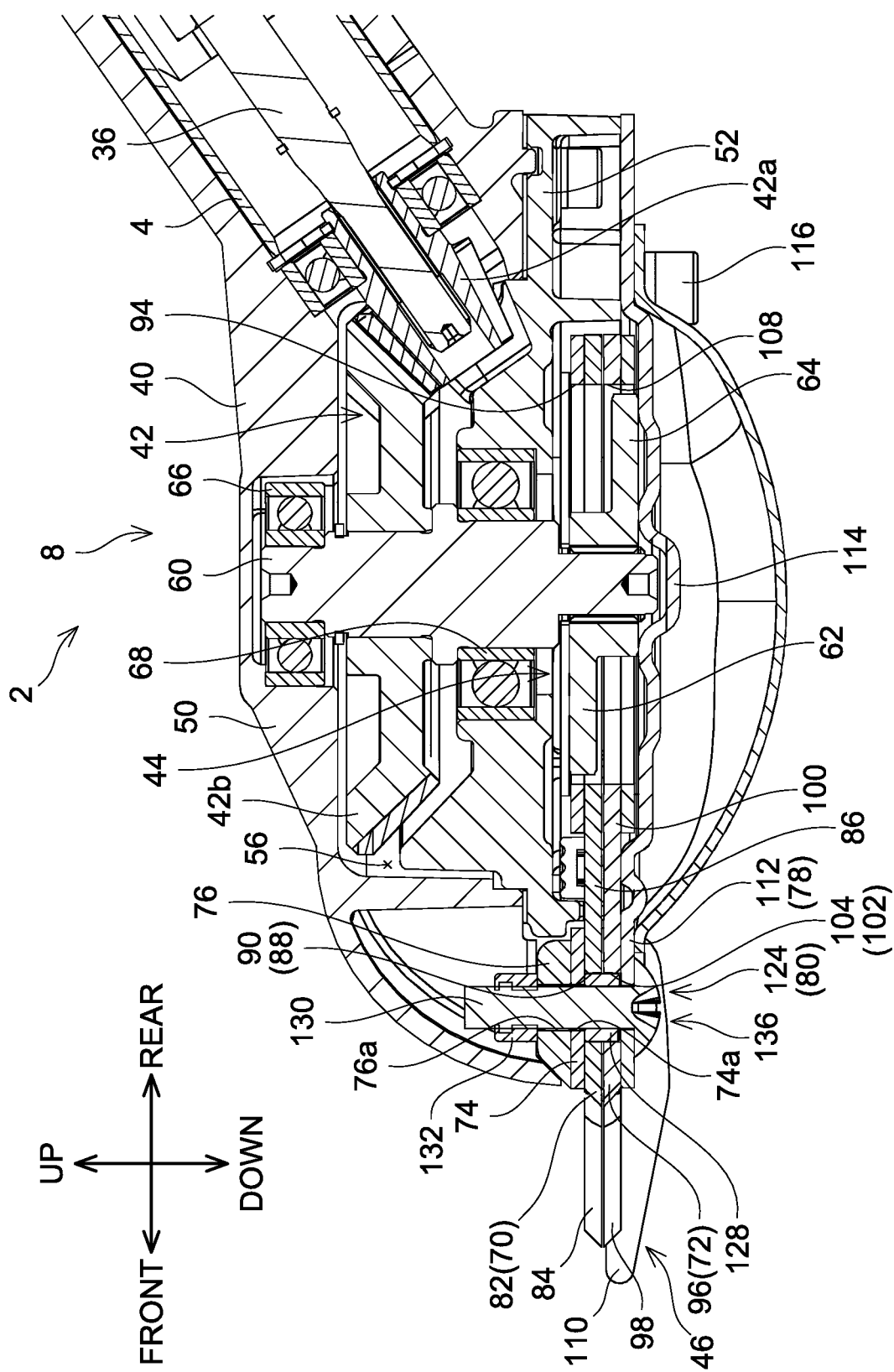

FIG. 5 is a cross-sectional view of the working machine 2 according to the first embodiment, in the vicinity of the front end unit 8.

Figure 6:
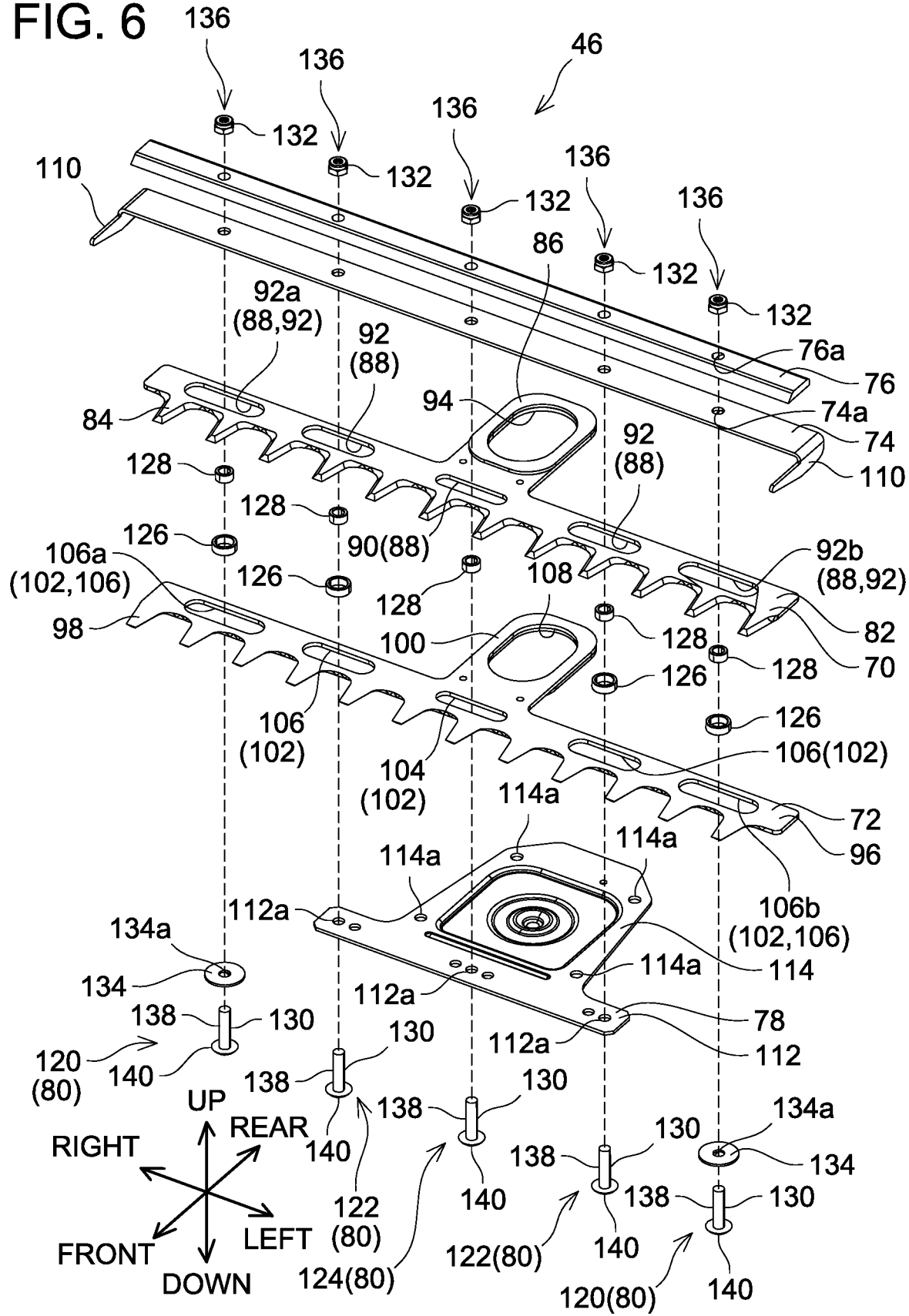

FIG. 6 is an exploded perspective view of a blade unit 46 of the working machine 2 according to the first embodiment.

Figure 7:
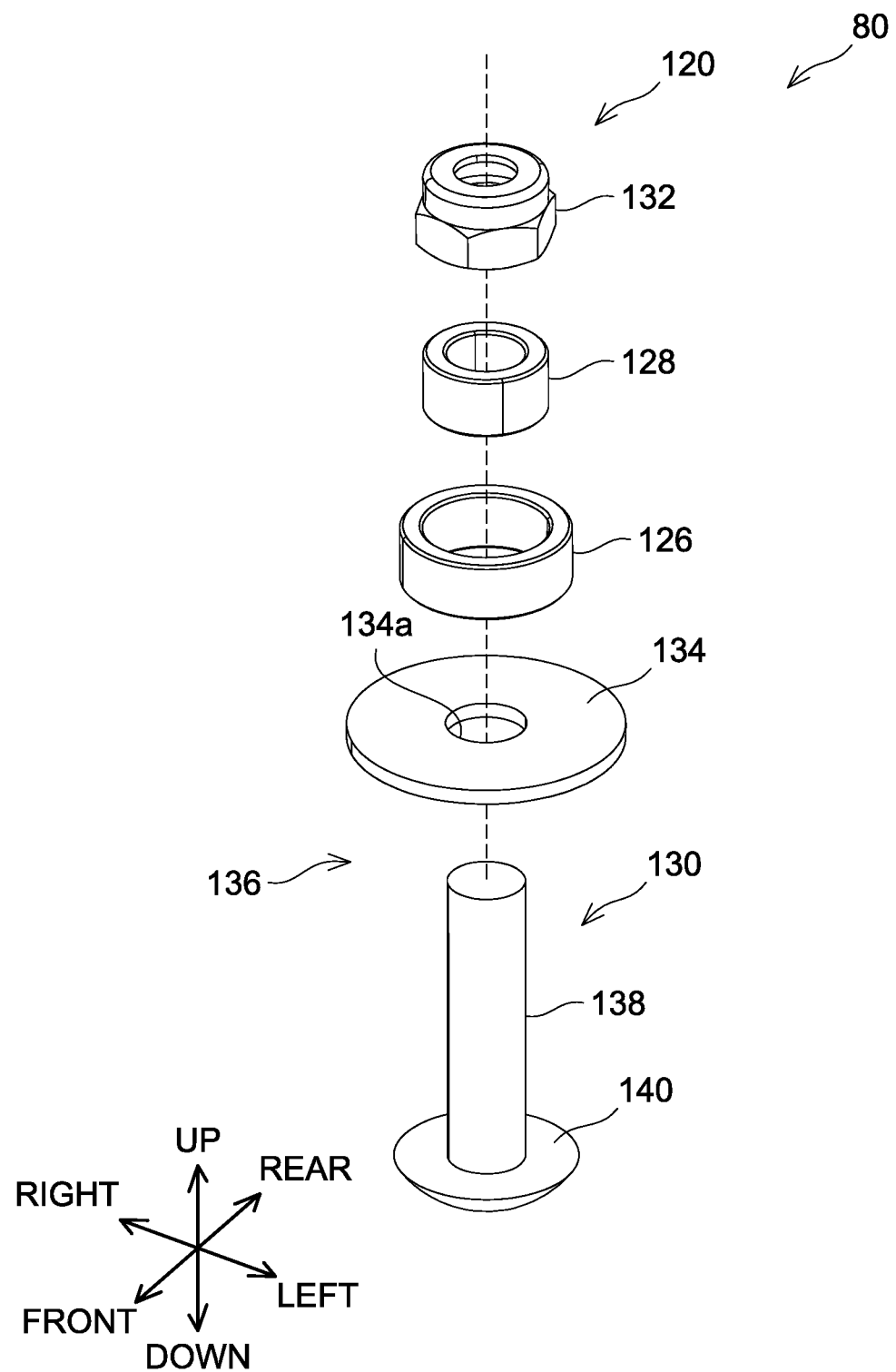

FIG. 7 is an exploded perspective view of a holding unit 80 of the working machine 2 according to the first embodiment.

Figure 8:
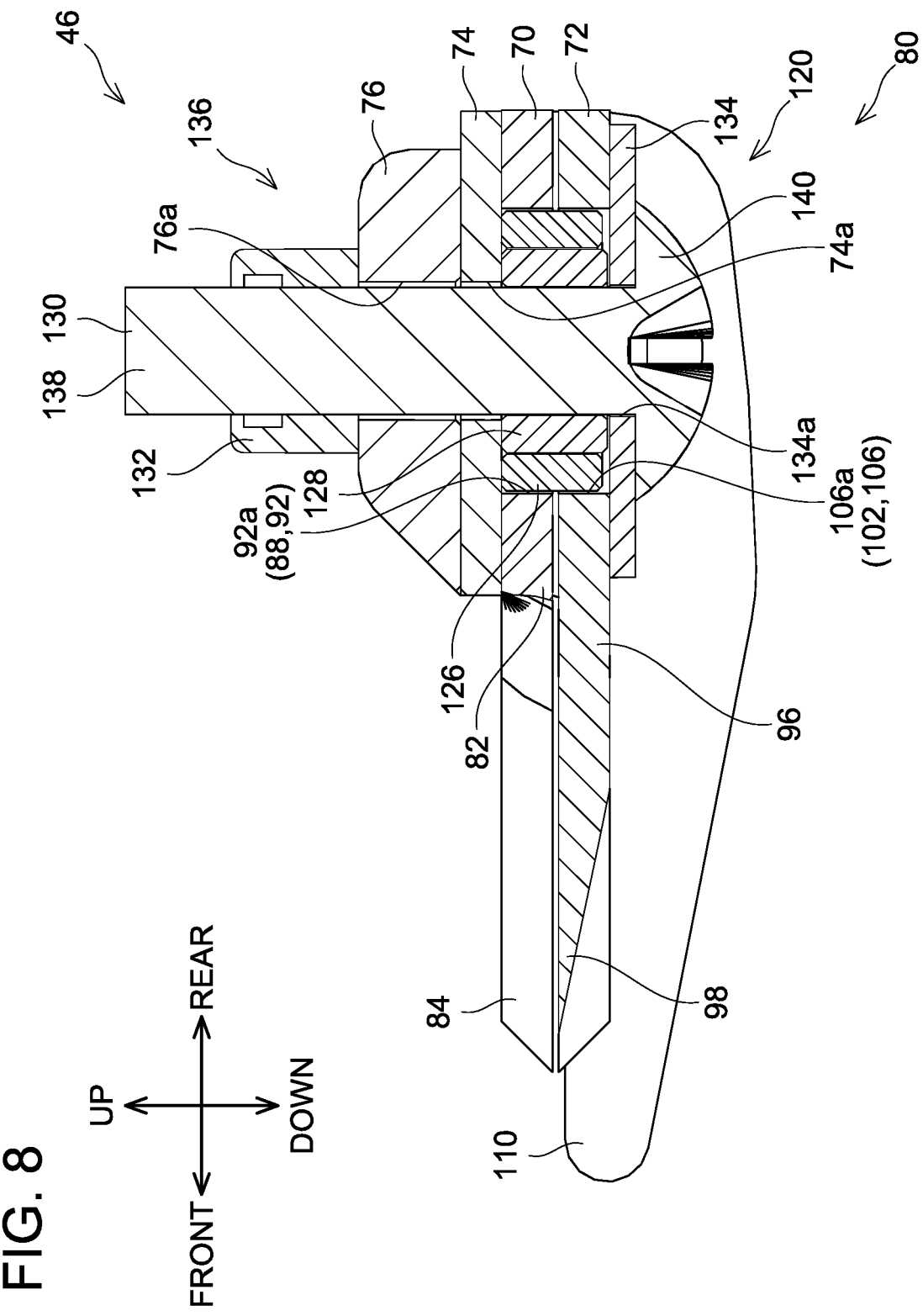

FIG. 8 is a cross-sectional view of a blade unit 46 of the working machine 2 according to the first embodiment.

Figure 9:
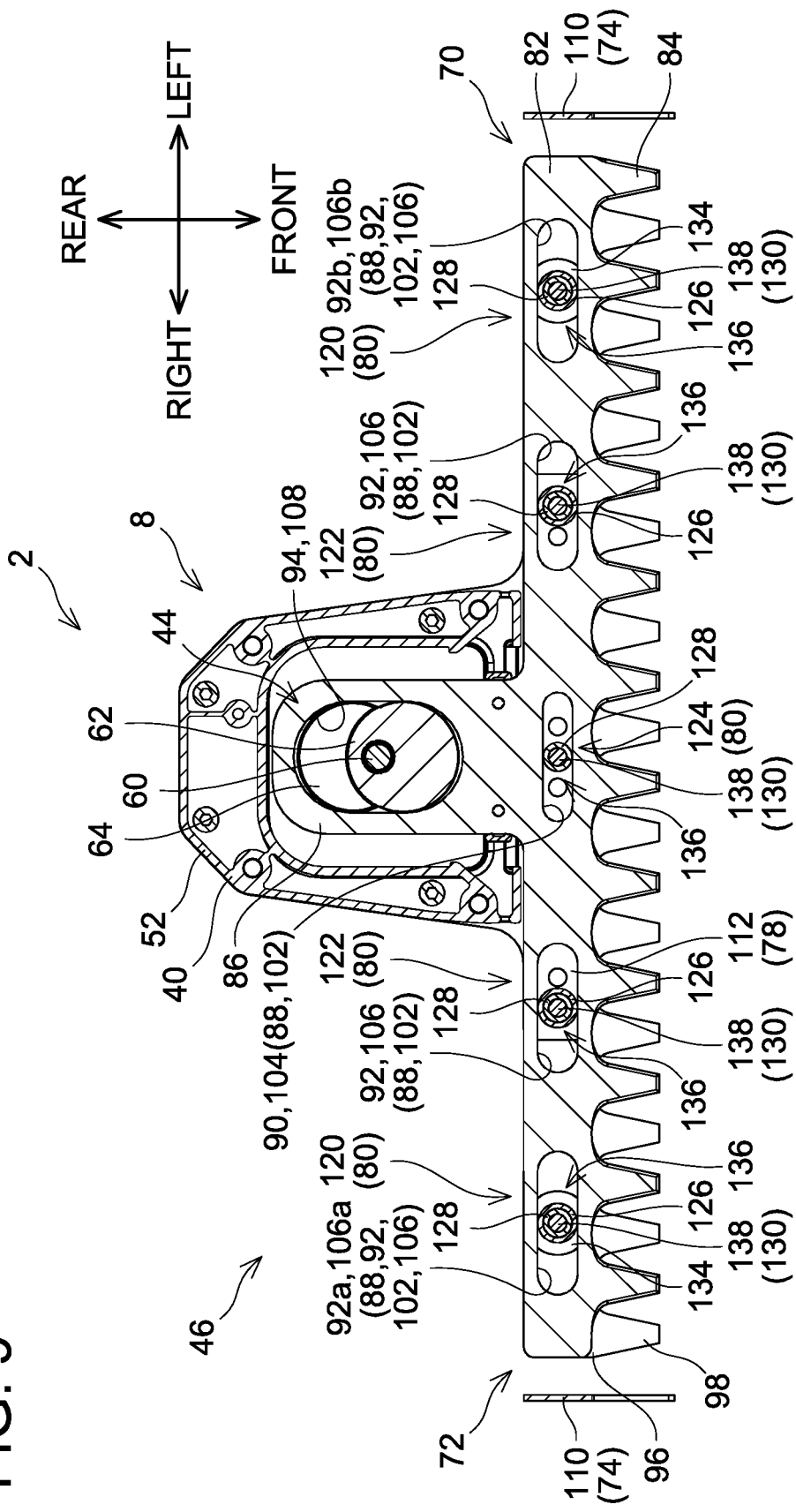

FIG. 9 is a top cross-sectional view of the working machine 2 according to the first embodiment, in the vicinity of the front end unit 8.

Figure 10:
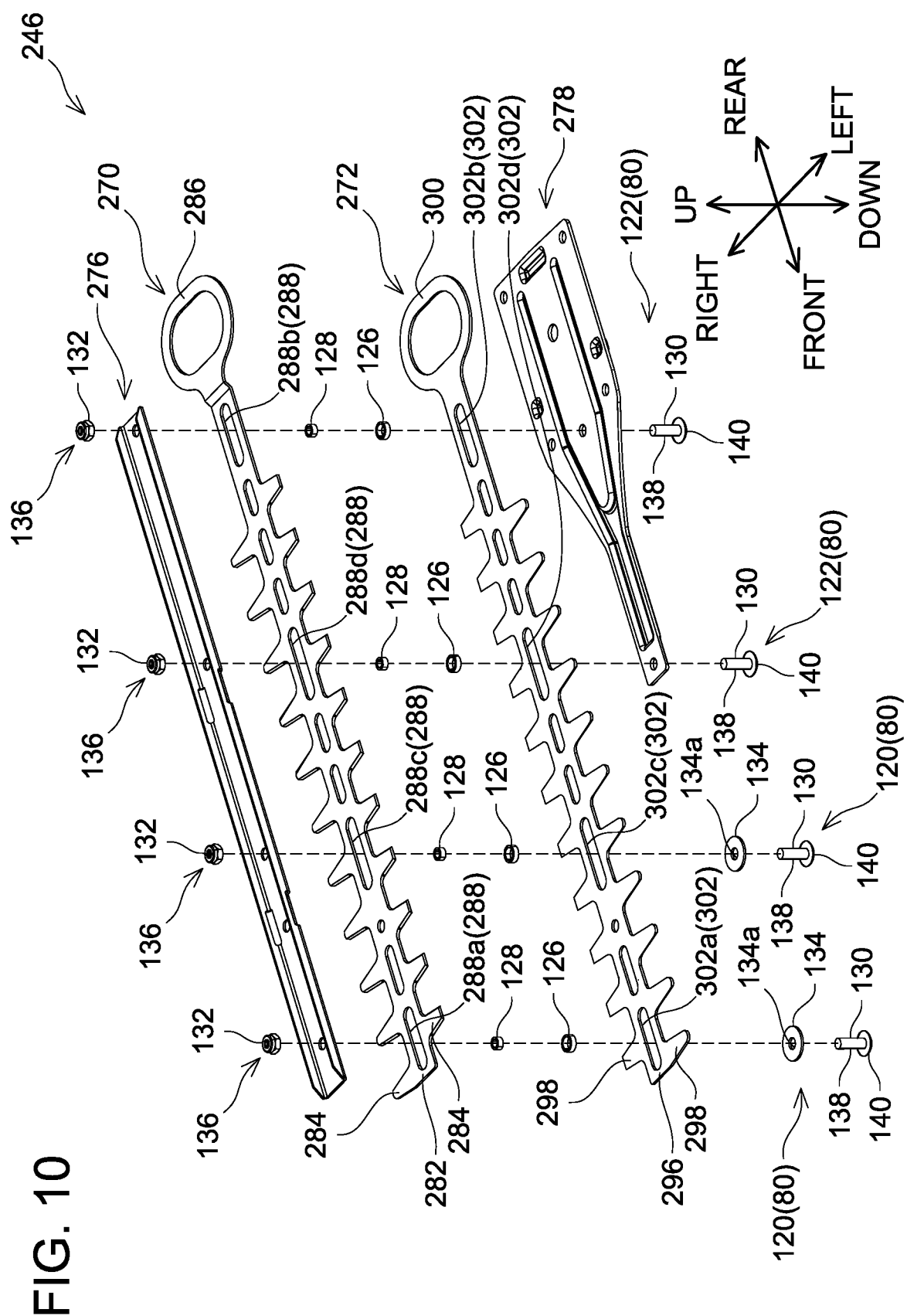

FIG. 10 is an exploded perspective view of a blade unit 246 of a working machine 2 according to a second embodiment.

Representative, non-limiting examples of the present disclosure will now be described in further detail with reference to the attached drawings. This detailed description is merely intended to teach a person of skill in the art further details for practicing preferred aspects of the present teachings and is not intended to limit the scope of the present disclosure. Furthermore, each of the additional features and teachings disclosed below may be utilized separately or in conjunction with other features and teachings to provide improved working machines and blade units, as well as methods for using and manufacturing the same.

Moreover, combinations of features and steps disclosed in the following detailed description may not be necessary to practice the present disclosure in the broadest sense, and are instead taught merely to particularly describe representative examples of the present disclosure. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

In one or more embodiments, the outer sleeve may be disposed in the first elongated hole and the second elongated hole.

According to the configuration above, when the first blade reciprocates with respect to the second blade, only the outer sleeve contacts the first and second blades, while the holding part does not contact the first blade nor the second blade. Thus, wear of the holding unit can be suppressed.

In one or more embodiments, the holding part may comprise an inner sleeve inserted in the outer sleeve, an outer circumference surface of the inner sleeve having a circular shape in cross-section. A length of the outer sleeve in the up-down direction may be shorter than a length of the inner sleeve in the up-down direction.

In general working machines, first and second blades may be interposed between a first member and a second member. If the length of outer sleeve in the up-down direction is longer than the length of inner sleeve in the up-down direction, the outer sleeve may be fixedly held between the first member and the second member and thus be unable to rotate around the inner sleeve. According to the configuration above, the outer sleeve being unable to rotate around the inner sleeve can be suppressed.

In one or more embodiments, the holding part may further comprise: a bolt comprising a head and supporting the inner sleeve; a nut screwed to the bolt; and a washer in which the bolt is inserted, the washer being disposed between the inner sleeve and the head. The inner sleeve, the bolt, the nut, and the washer may hold the first blade and the second blade overlapping with each other in the up-down direction.

According to the configuration above, the first blade and the second blade can be held overlapping each other in the up-down direction by means of the simple configuration of the holding part.

In one or more embodiments, the inner sleeve and the bolt may be separate components.

If the inner sleeve is integrated with the bolt, the integrated configuration is complicated. According to the configuration above, such complication in the configuration of the inner sleeve and the bolt can be suppressed.

In one or more embodiments, hardness of the outer sleeve may be different from hardness of the inner sleeve.

The rotation of the outer sleeve around the inner sleeve generates frictional heat. If the hardness of the outer sleeve is the same as the hardness of the inner sleeve, the outer sleeve may adhere to the inner sleeve due to the frictional heat. According to the configuration above, such adhesion of the outer sleeve to the inner sleeve can be suppressed.

In one or more embodiments, a material of the outer sleeve may be different from a material of the inner sleeve.

The rotation of the outer sleeve around the inner sleeve generates frictional heat. If the material of the outer sleeve is the same as the material of the inner sleeve, the outer sleeve may adhere to the inner sleeve due to the frictional heat. According to the configuration above, such adhesion of the outer sleeve to the inner sleeve can be suppressed.

In one or more embodiments, the first elongated hole of the first blade may comprise a plurality of first elongated holes arranged along the reciprocating direction. The second elongated hole of the second blade may comprise a plurality of second elongated holes arranged along the reciprocating direction. The plurality of first elongated holes may comprise a first one-end elongated hole disposed at one end of the plurality of first elongated holes in the reciprocating direction. The plurality of second elongated holes may comprise a second one-end elongated hole disposed at one end of the plurality of second elongated holes in the reciprocating direction, the second one-end elongated hole overlapping with the first one-end elongated hole in the up-down direction. The holding part may be inserted in the first one-end elongated hole and the second one-end elongated hole.

Generally, the reciprocation of the first blade causes vibration in a predetermined direction in the first blade. This vibration in the predetermined direction becomes larger toward one end of the first blade in the reciprocating direction. In the configuration where the holding part is inserted in the first elongated hole disposed at one end in the reciprocating direction and the second elongated hole disposed at one end in the reciprocating direction, the holding unit is pressed hard against the first blade by the reciprocation of the first blade. According to the configuration above, even though the holding unit is pressed against the first blade, the holding unit can release the force it receives from the first blade by the outer sleeve rotating around the holding part. Thus, wear of the holding unit can be suppressed.

In one or more embodiments, the holding unit may comprise a plurality of holding units. The plurality of first elongated holes may further comprise a first other-end elongated hole disposed at other end of the plurality of first elongated holes in the reciprocating direction. The plurality of second elongated holes may further comprise a second other-end elongated hole disposed at other end of the plurality of second elongated holes in the reciprocating direction, the second other-end elongated hole overlapping with the first other-end elongated hole in the up-down direction. The holding part of a holding unit of the plurality of holding units may be inserted in the first one-end elongated hole and the second one-end elongated hole. The holding part of another holding unit of the plurality of holding units may be inserted in the first other-end elongated hole and the second other-end elongated hole.

The vibration in the first blade caused by its reciprocation may become larger not only toward the one end of the first blade in the reciprocating direction but also toward the other end of the first blade in the reciprocating direction. According to the configuration above, even though the other holding unit of the plurality of holding units is pressed against the first blade due to the vibration in the first blade, the other holding unit of the plurality of holding units can also release the force it receives from the first blade by the outer sleeve rotating around the holding part. Thus, wear of the other holding unit of the plurality of holding units can be suppressed.

First Embodiment

Figure 1:
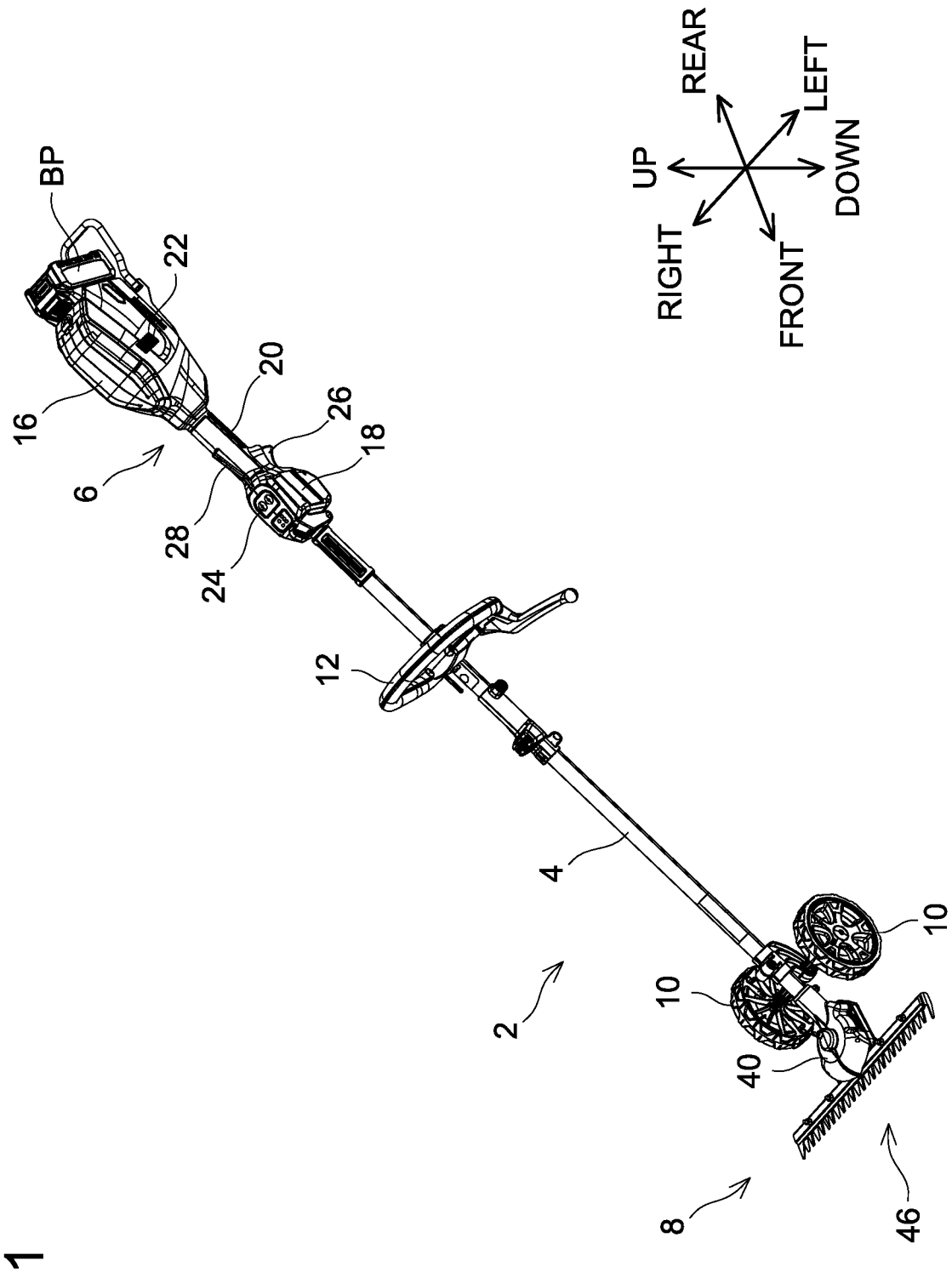
FIG. 1 is a perspective view of a working machine 2 according to a first embodiment.

As illustrated in FIG. 1, a working machine 2 according to a first embodiment is an electric working machine for gardening, such as a ground trimmer, and is used to cut grass, lawn, etc. on the ground. The working machine 2 comprises an operation rod 4 extending linearly, a rear end unit 6 attached to a longitudinal end of the operation rod 4, a front end unit 8 attached to the other longitudinal end of the operation rod 4, a pair of wheels 10 attached near the other longitudinal end of the operation rod 4, a loop handle 12 attached near a longitudinal center of the operation rod 4, and a battery pack BP. The working machine 2 operates using electric power supplied from the battery pack BP. A user rotates the pair of wheels 10 by pushing the working machine 2 forward while gripping the rear end unit 6 with one hand and the loop handle 12 with the other hand, so that he/she can cut grass, lawn, etc. on the ground while moving the working machine 2 on the ground. Hereinafter, a direction in which the working machine 2 is moved in response to the rotation of the pair of wheels 10 will be termed a front-rear direction, a direction perpendicular to the ground will be termed an up-down direction, and a direction perpendicular to both the front-rear direction and the up-down direction will be termed a left-right direction. Further, a direction in which the working machine 2 is moved to cut grass, lawn, etc. on the ground with the working machine 2 (a direction in which the working machine 2 is pushed in the present embodiment) will be termed a front direction, and the direction opposite to the front direction will be termed a rear direction.

Figure 2:
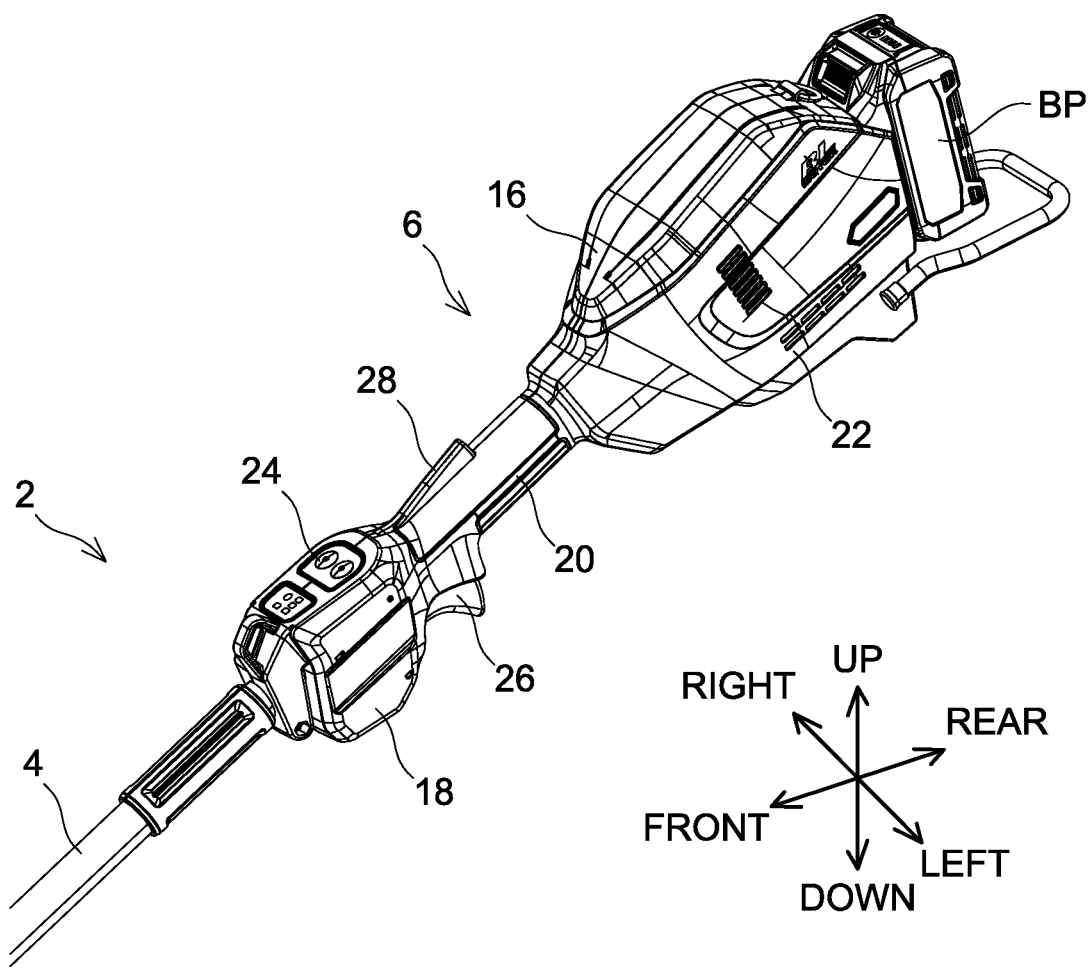
FIG. 2 is a perspective view of the working machine 2 according to the first embodiment, in the vicinity of a rear end unit 6.

As illustrated in FIG. 2, the rear end unit 6 comprises a rear end housing 16. The rear end housing 16 comprises a support 18, a grip 20, and a battery attachment part 22.

The operation rod 4 is inserted in the support 18. A main power switch 24 is disposed on an upper surface of the support 18. The main power switch 24 switches the working machine 2 between an on-state and an off-state.

The grip 20 is disposed rearward of the support 18. A trigger 26 is pivotably attached to a lower front portion of the grip 20. The trigger 26 is pushed in with finger(s) of the user gripping the grip 20. When the trigger 26 is pushed in while the working machine 2 is in the on-state, an electric motor 32 (see FIG. 3), which will be described later, operates.

A shark fin 28 is pivotably attached to an upper front portion of the grip 20. The shark fin 28 is pushed in with a palm of the user gripping the grip 20. In the state where the shark fin 28 is pushed in, the user can push in the trigger 26. On the other hand, in the state where the shark fin 28 is not pushed in, the user cannot push in the trigger 26.

The battery attachment part 22 is disposed rearward of the grip 20. The battery pack BP is detachably attached to a rear end of the battery attachment part 22. The battery pack BP can be attached to the battery attachment part 22 by sliding the battery pack BP downward with respect to the battery attachment part 22 along the rear end of the battery attachment part 22. The battery pack BP can be detached from the battery attachment part 22 by sliding the battery pack BP upward with respect to the battery attachment part 22 along the rear end of the battery attachment part 22. Thus, the battery pack BP can be detached from the battery attachment part 22 for charging.

The electric motor 32 and a reduction mechanism 34 as illustrated in FIG. 3 are housed in the battery attachment part 22. The electric motor 32 is an example of prime mover. The electric motor 32 is, for example, a brushless motor. In a variant, the electric motor 32 may be a brushed motor. The electric motor 32 operates (rotates) using electric power supplied from the battery pack BP (see FIG. 2).

The reduction mechanism 34 comprises a first reduction gear 34a and a second reduction gear 34b. The first reduction gear 34a and the second reduction gear 34b are spur gears. The first reduction gear 34a is coupled to a motor shaft 32a of the electric motor 32. The second reduction gear 34b meshes with the first reduction gear 34a. The number of teeth of the second reduction gear 34b is larger than the number of teeth of the first reduction gear 34a. When the first reduction gear 34a rotates with the rotation of the motor shaft 32a of the electric motor 32, the second reduction gear 34b rotates at a lower rotational speed than that of the first reduction gear 34a.

The second reduction gear 34b is coupled to a transmission shaft 36. The transmission shaft 36 extends from the rear end unit 6 (see FIG. 1) to the front end unit 8 (see FIG. 1) through the operation rod 4 (see FIG. 1). The transmission shaft 36 rotates with the rotation of the second reduction gear 34b.

As illustrated in FIG. 4, the front end unit 8 is disposed forward of the pair of wheels and attached to the operation rod 4. The front end unit 8 comprises a front end housing 40, a reduction mechanism 42 (see FIG. 5), a conversion mechanism 44 (see FIG. 5), and a blade unit 46.

As illustrated in FIG. 5, the front end housing 40 comprises a gear housing 50 and a cover member 52. The gear housing 50 is coupled to a front end of the operation rod 4 with a screw (not illustrated). The cover member 52 closes a lower end opening of the gear housing 50. Thus, a gear accommodating chamber 56 is defined between the gear housing 50 and the cover member 52.

The reduction mechanism 42 is disposed in the gear accommodating chamber 56. The reduction mechanism 42 comprises a third reduction gear 42a and a fourth reduction gear 42b. The third reduction gear 42a and the fourth reduction gear 42b are bevel gears. The third reduction gear 42a is coupled to a front end of the transmission shaft 36. The fourth reduction gear 42b meshes with the third reduction gear 42a. The number of teeth of the fourth reduction gear 42b is larger than the number of teeth of the third reduction gear 42a. When the third reduction gear 42a rotates with the rotation of the transmission shaft 36, the fourth reduction gear 42b rotates at a lower rotational speed than that of the third reduction gear 42a. The fourth reduction gear 42b rotates about a rotation axis along the up-down direction.

The conversion mechanism 44 is a conversion mechanism of cam-crank type. The conversion mechanism 44 converts the motion of the electric motor 32 (see FIG. 3) into another motion. Further, the conversion mechanism 44 transmits the motion of the electric motor 32 to the blade unit 46. The conversion mechanism 44 comprises a crank shaft 60, an upper disk 62, and a lower disk 64. The crank shaft 60 is rotatably supported by the gear housing 50 and the cover member 52 via bearings 66, 68. The crank shaft 60 is coupled to the fourth reduction gear 42b. Further, the crank shaft 60 penetrates the cover member 52 and a lower end of the crank shaft 60 is positioned outside of the gear accommodating chamber 56.

The upper disk 62 and the lower disk 64 are coupled to the lower end of the crank shaft 60. The upper disk 62 and the lower disk 64 each have a circular disk shape. The upper disk 62 and the lower disk 64 rotate with the rotation of the crank shaft 60. As illustrated in FIG. 9, the center of rotation of the upper disk 62 is offset from the center of the circular disk shape of the upper disk 62, and the center of rotation of the lower disk 64 is offset from the center of the circular disk shape of the lower disk 64. When the upper disk 62 rotates forward, the lower disk 64 rotates rearward. When the upper disk 62 rotates rearward, the lower disk 64 rotates forward.

Referring to FIG. 6, the blade unit 46 is described. The blade unit 46 according to the present embodiment is configured to cut grass, lawn, etc. on the ground. The blade unit 46 comprises a first blade 70, a second blade 72, an intermediate plate 74, a first guide member 76, a second guide member 78, and a plurality of holding units 80 (five holding units 80 in the present embodiment).

The first blade 70 comprises a first blade body 82, a plurality of first blade edges 84, and a first crank plate 86. The first blade body 82 extends in the left-right direction. A lower surface (slide surface) of the first blade body 82 is perpendicular to the up-down direction. The first blade body 82 includes a plurality of first elongated holes 88 (five first elongated holes 88 in the present embodiment) having a longitudinal direction along the left-right direction. The first elongated holes 88 penetrate the first blade body 82 in its thickness direction (in the up-down direction). The five first elongated holes 88 include a first center elongated hole 90 and four first off-center elongated holes 92. The first center elongated hole 90 is the first elongated hole 88 positioned at the center among the five first elongated holes 88. A width of the first center elongated hole 90 in the front-rear direction is smaller than a width of the first off-center elongated holes 92 in the front-rear direction. A width of the first center elongated hole 90 in the left-right direction is substantially the same as a width of the first off-center elongated holes 92 in the left-right direction. Two of the first off-center elongated holes 92 are positioned rightward of the first center elongated hole 90, while the other two first off-center elongated holes 92 are positioned leftward of the first center elongated hole 90. Hereinafter, the rightmost first off-center elongated hole 92 may be termed a first right-end elongated hole 92a and the leftmost first off-center elongated hole 92 may be termed a first left-end elongated hole 92b.

The plurality of first blade edges 84 projects forward from a front surface of the first blade body 82. The first blade edges 84 are arranged along the left-right direction. The first crank plate 86 is positioned near the center of the first blade body 82 in the left-right direction and rearward of the first blade body 82. The first crank plate 86 includes a first crank opening 94 penetrating the first crank plate 86 in the up-down direction. The first blade 70 is connected to the conversion mechanism 44 (see FIG. 5) by the upper disk 62 (see FIG. 5) being arranged in the first crank opening 94.

The second blade 72 overlaps with the first blade 70 in the up-down direction such that it is positioned below the first blade 70. The second blade 72 has a shape that coincides with the shape of the first blade 70. The second blade 72 comprises a second blade body 96, a plurality of second blade edges 98, and a second crank plate 100. The second blade body 96 extends in the left-right direction. An upper surface (slide surface) of the second blade body 96 is perpendicular to the up-down direction. The upper surface of the second blade body 96 faces the lower surface of the first blade body 82. The second blade body 96 includes a plurality of second elongated holes 102 (five second elongated holes 102 in the present embodiment) having a longitudinal direction along the left-right direction. The second elongated holes 102 overlap with the first elongated holes 88 in the up-down direction. The second elongated holes 102 penetrate the second blade body 96 in its thickness direction (in the up-down direction). The five second elongated holes 102 include a second center elongated hole 104 and four second off-center elongated holes 106. The second center elongated hole 104 is the second elongated hole 102 positioned at the center among the five second elongated holes 102. A width of the second center elongated hole 104 in the front-rear direction is substantially the same as the width of the first center elongated hole 90 in the front-rear direction and is smaller than a width of the second off-center elongated holes 106 in the front-rear direction. A width of the second center elongated hole 104 in the left-right direction is substantially the same as each of the width of the first center elongated hole 90 in the left-right direction and a width of the second off-center elongated holes 106 in the left-right direction. The width of the second off-center elongated holes 106 in the front-rear direction is substantially the same as the width of the first off-center elongated holes 92 in the front-rear direction. Two of the second off-center elongated holes 106 are positioned rightward of the second center elongated hole 104, while the other two second off-center elongated holes 106 are positioned leftward of the second center elongated hole 104. Hereinafter, the rightmost second off-center elongated hole 106 may be termed a second right-end elongated hole 106a and the leftmost second off-center elongated hole 106 may be termed a second left-end elongated hole 106b.

The plurality of second blade edges 98 projects forward from a front surface of the second blade body 96. The second blade edges 98 are arranged along the left-right direction. The second crank plate 100 is positioned near the center of the second blade body 96 in the left-right direction and rearward of the second blade body 96. The second crank plate 100 includes a second crank opening 108 penetrating the second crank plate 100 in the up-down direction. The second blade 72 is connected to the conversion mechanism 44 (see FIG. 5) by the lower disk 64 (see FIG. 5) being arranged in the second crank opening 108.

The intermediate plate 74 overlaps with the first blade 70 in the up-down direction such that it is positioned above the first blade 70. The intermediate plate 74 extends in the left-right direction. Projections 110 that extend forward are formed at both ends of the intermediate plate 74, respectively. The intermediate plate 74 closes the plurality of first elongated holes 88 from above. The intermediate plate 74 includes a plurality of intermediate screw holes 74a (five intermediate screw holes 74a in the present embodiment) penetrating the intermediate plate 74 in its thickness direction (in the up-down direction). The intermediate screw holes 74a are arranged along the left-right direction.

The first guide member 76 overlaps with the intermediate plate 74 in the up-down direction such that it is positioned above the intermediate plate 74. The first guide member 76 extends in the left-right direction. The first guide member 76 includes a plurality of first screw holes 76a (five first screw holes 76a in the present embodiment) penetrating the first guide member 76 in its thickness direction (in the up-down direction). The first screw holes 76a are arranged along the left-right direction.

The second guide member 78 overlaps with the second blade 72 in the up-down direction such that it is positioned below the second blade 72. The second guide member 78 comprises a second guide member body 112 and a cover member 114. The second guide member body 112 extends in the left-right direction. The second guide member body 112 closes the plurality of second elongated holes 102 from below. The second guide member body 112 includes a plurality of second front screw holes 112a penetrating the second guide member body 112 in its thickness direction (in the up-down direction). The second front screw holes 112a are arranged along the left-right direction. The cover member 114 is positioned near the center of the second guide member body 112 in the left-right direction and rearward of the second guide member body 112. The cover member 114 includes a plurality of second rear screw holes 114a penetrating the cover member 114 in its thickness direction (in the up-down direction). The second guide member 78 is fixed to the cover member 52 (see FIG. 5) by screws 116 being inserted in the second rear screw holes 114a.

The five holding units 80 comprise two first holding units 120, two second holding units 122, and a third holding unit 124. As illustrated in FIG. 7, each first holding unit 120 comprises an outer sleeve 126, an inner sleeve 128, a bolt 130, a nut 132, and a washer 134. Hereinafter, the inner sleeve 128, the bolt 130, the nut 132, and the washer 134 may collectively be termed a holding part 136.

The outer sleeve 126 has a cylindrical shape. The outer sleeve 126 is constituted of a metal material or a resin material. As illustrated in FIG. 8, the outer sleeve 126 is disposed in a first off-center elongated hole 92 and a second off-center elongated hole 106. The diameter of an outer circumferential surface of the outer sleeve 126 is smaller than the width of the first off-center elongated holes 92 in the front-rear direction and the width of the second off-center elongated holes 106 in the front-rear direction. A thickness of the outer sleeve 126 (a width thereof in the up-down direction) is equal to or larger than a sum of a thickness of the first blade body 82 (a width thereof in the up-down direction) and a thickness of the second blade body 96 (a width thereof in the up-down direction). In a variant, the thickness of the outer sleeve 126 may be smaller than the sum of the thickness of the first blade body 82 and the thickness of the second blade body 96.

As illustrated in FIG. 7, the inner sleeve 128 has a cylindrical shape. The inner sleeve 128 is constituted of a metal material or a resin material. The material of the inner sleeve 128 is different from the material of the outer sleeve 126. Hardness of the inner sleeve 128 is different from hardness of the outer sleeve 126. That is, the hardness of the inner sleeve 128 may be smaller or larger than the hardness of the outer sleeve 126. As long as the hardness of the inner sleeve 128 is different from the hardness of the outer sleeve 126, the material of the inner sleeve 128 may be the same as the material of the outer sleeve 126.

As illustrated in FIG. 8, the inner sleeve 128 is disposed in the first off-center elongated hole 92 and the second off-center elongated hole 106. The inner sleeve 128 is inserted in the outer sleeve 126. An outer circumferential surface of the inner sleeve 128 faces an inner circumferential surface of the outer sleeve 126. The diameter of the outer circumferential surface of the inner sleeve 128 is slightly smaller than the diameter of the inner circumferential surface of the outer sleeve 126. Thus, the outer sleeve 126 is rotatable around the inner sleeve 128. A thickness of the inner sleeve 128 (a width thereof in the up-down direction) is larger than the sum of the thickness of the first blade body 82 and the thickness of the second blade body 96. The inner sleeve 128 is thus fixedly held between the intermediate plate 74 and the second guide member 78. The inner sleeve 128 is not movable with respect to the intermediate plate 74 and the second guide member 78. Further, the thickness of the inner sleeve 128 is larger than the thickness of the outer sleeve 126. The outer sleeve 126 is thus not fixedly held between the intermediate plate 74 and the second guide member 78. The outer sleeve 126 is movable with respect to the intermediate plate 74 and the second guide member 78.

As illustrated in FIG. 7, the bolt 130 comprises a shank 138 and a head 140. The shank 138 extends in the up-down direction. A portion of the shank 138 near its one end is screwable into the nut 132. The head 140 is positioned at the other end of the shank 138.

As illustrated in FIG. 8, the shank 138 passes through the inner sleeve 128, the first off-center elongated hole 92, the second off-center elongated hole 106, an intermediate screw hole 74a, and a first screw hole 76a. The shank 138 supports the inner sleeve 128.

As illustrated in FIG. 7, the washer 134 has a circular disk shape including a through hole 134a at the center. As illustrated in FIG. 8, the shank 138 passes through the through hole 134a. The washer 134 is interposed between the inner sleeve 128 and the head 140 and between the second blade 72 and the head 140.

Once the nut 132 and the shank 138 are screwed together, the first blade 70, the second blade 72, the intermediate plate 74, and the first guide member 76 are held between the nut 132 and the washer 134. In this way, the holding part 136 fixes the positions of the second blade 72, the intermediate plate 74, and the first guide member 76 relative to the first blade 70 in the up-down direction. That is, the holding part 136 holds the first guide member 76, the intermediate plate 74, the first blade 70, and the second blade 72 overlapping each other in the up-down direction.

As illustrated in FIG. 6, each second holding unit 122 comprises the outer sleeve 126, the inner sleeve 128, the bolt 130, and the nut 132. For the second holding units 122, the second guide member body 112 serves as a washer. Further, their shanks 138 pass through corresponding inner sleeves 128, second front screw holes 112a, first off-center elongated holes 92, second off-center elongated holes 106, intermediate screw holes 74a, and first screw holes 76a.

The third holding unit 124 comprises the inner sleeve 128, the bolt 130, and the nut 132. For the third holding unit 124, the second guide member body 112 serves as a washer. Only the inner sleeve 128 is disposed in the first center elongated hole 90 and the second center elongated hole 104. Further, the shank 138 passes through the inner sleeve 128, a corresponding second front screw hole 112a, the first center elongated hole 90, the second center elongated hole 104, a corresponding intermediate crew hole 74a, and a corresponding first screw hole 76a.

Next, operation of the first blade 70 and the second blade 72 is described. As illustrated in FIG. 9, in response to operation (rotation) of the electric motor 32 (see FIG. 3), the upper disk 62 rotates in contact with an inner surface of the first crank opening 94 and the lower disk 64 rotates in contact with an inner surface of the second crank opening 108. The first blade 70 and the second blade 72 thus reciprocate in the left-right direction with respect to the front end housing 40. When the first blade 70 moves leftward, the second blade 72 moves rightward, whereas when the first blade 70 moves rightward, the second blade 72 moves leftward.

During the reciprocation of the first blade 70 and the second blade 72, the inner sleeve 128 in the first center elongated hole 90 and the second center elongated hole 104 guides the first blade 70 and the second blade 72 while contacting inner surfaces of the first center elongated hole 90 and the second center elongated hole 104. This inner sleeve 128 does not rotate around the shank 138 since it is fixedly held between the intermediate plate 74 (see FIG. 6) and the second guide member 78 (see FIG. 6).

Further, during the reciprocation of the first blade 70 and the second blade 72, the outer sleeves 126 in the first off-center elongated holes 92 and the second off-center elongated holes 106 guide the first blade 70 and the second blade 72 while contacting inner surfaces of the first off-center elongated holes 92 and the second off-center elongated holes 106. Since the outer sleeves 126 are not fixedly held between the intermediate plate 74 (see FIG. 6) and the second guide member 78 (see FIG. 6), the outer sleeves 126 rotate around the inner sleeves 128 in conjunction with the reciprocation of the first blade 70 and the second blade 72. These inner sleeves 128 do not rotate even when their outer sleeves 126 rotate since they are fixedly held between the intermediate plate 74 (see FIG. 6) and the second guide member 78 (see FIG. 6).

The reciprocation of the first blade 70 and the second blade 72 causes vibration in the front-rear direction in the first blade 70 and the second blade 72. This vibration in the front-rear direction becomes larger toward farther positions from the crank shaft 60, i.e., toward the ends of the first blade 70 and the second blade 72 in the left-right direction from the centers thereof. Thus, the vibration in the front-rear direction in the first blade 70 and the second blade 72 is larger near the first off-center elongated holes 92 and the second off-center elongated holes 106 than near the first center elongated hole 90 and the second center elongated hole 104. Further, the vibration in the front-rear direction in the first blade 70 and the second blade 72 is maximized near the first right-end elongated hole 92a, the first left-end elongated hole 92b, the second right-end elongated hole 106a, and the second left-end elongated hole 106b. In the first right-end elongated hole 92a, the first left-end elongated hole 92b, the second right-end elongated hole 106a, and the second left-end elongated hole 106b, the first blade 70 and the second blade 72 are pressed hard against the outer sleeves 126 due to the vibration in the front-rear direction in the first blade 70 and the second blade 72. Since the outer sleeves 126 rotate around the inner sleeves 128 even though the first blade 70 and the second blade 72 are pressed hard against the outer sleeves 126, the outer sleeves 126 are less likely to be worn.

Effects

The working machine 2 comprises the electric motor 32 (an example of prime mover), the conversion mechanism 44 configured to move in response to rotation of the electric motor 32, the first blade 70 connected to the conversion mechanism 44, the second blade 72 overlapping with the first blade 70 in the up-down direction, and the holding units 80 configured to hold the first blade 70 and the second blade 72 overlapping each other in the up-down direction. The first blade 70 is configured to reciprocate in the left-right direction (an example of reciprocating direction) perpendicular to the up-down direction with respect to the second blade 72 when the conversion mechanism 44 moves. The first blade 70 includes the first elongated holes 88 having a longitudinal direction along the left-right direction. The second blade 72 includes the second elongated holes 102 having a longitudinal direction along the left-right direction. Each of the holding units 120, 122 comprises the holding part 136 inserted in corresponding one of the first elongated holes 88 of the first blade 70 and corresponding one of the second elongated holes 102 of the second blade 72, and the outer sleeve 126 having a cylindrical shape and supported by the holding part 136 such that the outer sleeve 126 is rotatable around the holding part 136.

According to the configuration above, when the first blade 70 reciprocates with respect to the second blade 72, the outer sleeves 126 rotate around the holding parts 136 in response to the reciprocation of the first blade 70. This suppresses wear of the outer sleeves 126 caused by them rubbing against the first blade 70.

Further, the blade unit 46 is a blade unit to which the motion of the electric motor 32 (an example of prime mover) is transmitted via the conversion mechanism 44. The blade unit 46 comprises the first blade 70 connected to the conversion mechanism 44, the second blade 72 overlapping with the first blade 70 in the up-down direction, and the holding units 80 configured to hold the first blade 70 and the second blade 72 overlapping each other in the up-down direction. The first blade 70 is configured to reciprocate in the left-right direction (an example of reciprocating direction) perpendicular to the up-down direction with respect to the second blade 72 when the conversion mechanism 44 moves in response to the motion of the electric motor 32. The first blade 70 includes the first elongated holes 88 having a longitudinal direction along the left-right direction. The second blade 72 includes the second elongated holes 102 having a longitudinal direction along the left-right direction. Each of the holding units 120, 122 comprises the holding part 136 inserted in corresponding one of the first elongated holes 88 of the first blade 70 and corresponding one of the second elongated holes 102 of the second blade 72, and the outer sleeve 126 having a cylindrical shape and supported by the holding part 136 such that the outer sleeve 126 is rotatable around the holding part 136.

According to the configuration above, the same effect as the one of the working machine above can be produced.

Further, the outer sleeves 126 are disposed in their corresponding first elongated holes 88 and second elongated holes 102.

According to the configuration above, when the first blade 70 reciprocates with respect to the second blade 72, only the outer sleeves 126 contact the first blade 70 and the second blade 72, while the holding parts 136 do not contact the first blade 70 nor the second blade 72. Thus, wear of the holding units 80 can be suppressed.

Each of the holding parts 136 comprises the inner sleeve 128 inserted in a corresponding outer sleeve 126. The outer circumference surface of each inner sleeve 128 has a circular shape in cross-section. The length of the outer sleeves 126 in the up-down direction is shorter than the length of the inner sleeves 128 in the up-down direction.

In general working machines, the first blade 70 and the second blade 72 may be interposed between the intermediate plate 74 (an example of first member) and the second guide member 78 (an example of second member). If the length of the outer sleeves 126 in the up-down direction is longer than the length of the inner sleeves 128 in the up-down direction, the outer sleeves 126 may be fixedly held between the intermediate plate 74 and the second guide member 78 and thus be unable to rotate around the inner sleeves 128. According to the configuration above, the outer sleeves 126 being unable to rotate around the inner sleeves 128 can be suppressed.

Further, each holding part 136 further comprises the bolt 130 comprising the head 140 and supporting the inner sleeve 128, the nut 132 screwed to the bolt 130, and the washer 134 in which the bolt 130 is inserted, the washer 134 being disposed between the inner sleeve 128 and the head 140. The inner sleeves 128, the bolts 130, the nuts 132, and the washers 134 hold the first blade 70 and the second blade 72 overlapping each other in the up-down direction.

According to the configuration above, the first blade 70 and the second blade 72 can be held overlapping each other in the up-down direction by means of the simple configuration of the holding parts 136.

Further, the inner sleeves 128 and the bolts 130 are separate components.

If the inner sleeves 128 are integrated with the bolts 130, the integrated configuration is complicated. According to the configuration above, such complication in the configuration of the inner sleeves 128 and the bolts 130 can be suppressed.

Further, the hardness of the outer sleeves 126 is different from the hardness of the inner sleeves 128.

The rotation of the outer sleeves 126 around corresponding inner sleeves 128 generates frictional heat. If the hardness of the outer sleeves 126 is the same as the hardness of the inner sleeves 128, the outer sleeves 126 may adhere to the inner sleeves 128 due to the frictional heat. According to the configuration above, such adhesion of the outer sleeves 126 to the inner sleeves 128 can be suppressed.

Further, the material of the outer sleeves 126 is different from the material of the inner sleeves 128.

The rotation of the outer sleeves 126 around corresponding inner sleeves 128 generates frictional heat. If the material of the outer sleeves 126 is the same as the material of the inner sleeves 128, the outer sleeves 126 may adhere to the inner sleeves 128 due to the frictional heat. According to the configuration above, such adhesion of the outer sleeves 126 to the inner sleeves 128 can be suppressed.

Further, the first blade 70 includes the plurality of first elongated holes 88 arranged along the left-right direction. The second blade 72 includes the plurality of second elongated holes 102 arranged along the left-right direction. The plurality of first elongated holes 88 comprises the first right-end elongated hole 92*a* (an example of first one-end elongated hole) disposed at the right end (an example of one end) of the plurality of first elongated holes 88 in the left-right direction. The plurality of second elongated holes 102 comprises the second right-end elongated hole 106*a* (an example of second one-end elongated hole) disposed at the right end (an example of one end) of the plurality of second elongated holes 102 in the left-right direction. The second right-end elongated hole 106*a* overlaps with the first right-end elongated hole 92*a* in the up-down direction. One of the holding units 80 is inserted in the first right-end elongated hole 92*a* and the second right-end elongated hole 106*a*.

Generally, the reciprocation of the first blade 70 causes vibration in a predetermined direction in the first blade 70. This vibration in the predetermined direction becomes larger toward the right end of the first blade 70 in the left-right direction. In the configuration where one of the holding parts 136 is inserted in the first right-end elongated hole 92*a* disposed at the one end in the left-right direction and the second right-end elongated hole 106*a* disposed at the one end in the left-right direction, the holding unit 80 is pressed hard against the first blade 70 due to the reciprocation of the first blade 70. According to the configuration above, even though the holding unit 80 is pressed against the first blade 70, the holding unit 80 can release the force it receives from the first blade 70 by its outer sleeve 126 rotating around the holding part 136. Thus, wear of the holding unit 80 can be suppressed.

Further, the working machine 2 comprises the plurality of holding units 80. The plurality of first elongated holes 88 further comprises the first left-end elongated hole 92*b* (an example of first other-end elongated hole) disposed at the left end (an example of other end) of the plurality of first elongated holes 88 in the left-right direction. The plurality of second elongated holes 102 further comprises the second left-end elongated hole 106*b* (an example of second other-end elongated hole) disposed at the left end (an example of other end) of the plurality of second elongated holes 102 in the left-right direction. The second left-end elongated hole 106*b* overlaps with the first left-end elongated hole 92*b* in the up-down direction. The holding part 136 of one holding unit 80 of the plurality of holding units 80 is inserted in the first right-end elongated hole 92*a* and the second right-end elongated hole 106*a*. The holding part 136 of another holding unit 80 of the plurality of holding units 80 is inserted in the first left-end elongated hole 92*b* and the second left-end elongated hole 106*b*.

The vibration in the first blade 70 caused by its reciprocation may become larger not only toward the right end of the first blade 70 in the reciprocating direction but also toward the left end of the first blade 70 in the reciprocating direction. According to the configuration above, even though the other holding unit 80 of the plurality of holding units 80 is pressed against the first blade 70 due to the vibration in the first blade 70, the other holding unit 80 of the plurality of holding units 80 can also release the force it receives from the first blade 70 by its outer sleeve 126 rotating around the holding part 136. Thus, wear of the other holding unit 80 of the plurality of holding units 80 can be suppressed.

Second Embodiment

Referring to FIG. 10, a second embodiment is described. For the second embodiment, only differences from the first embodiment will be described, and the same configurations as those of the first embodiment will be labeled with the same/like reference signs and description thereof will be omitted. A blade unit 246 according to the second embodiment is used for a hedge trimmer. The blade unit 246 is fixed to a front end housing 40 (see FIG. 4).

The blade unit 246 comprises a first blade 270, a second blade 272, a first guide member 276, a second guide member 278, and a plurality of holding units 80 (four holding units 80 in the present embodiment). The first blade 270 comprises a first blade body 282 extending in the front-rear direction, a plurality of first blade edges 284 disposed on both left and right surfaces of the first blade body 282, and a first crank plate 286 connected to an upper disk 62 (see FIG. 4). The first blade body 282 includes a plurality of first elongated holes 288 (four first elongated holes 288 in the present embodiment) having a longitudinal direction along the front-rear direction. Hereinafter, the frontmost first elongated hole 288 will be termed a first front-end elongated hole 288*a*, and the rearmost first elongated hole 288 will be termed a first rear-end elongated hole 288*b*. Further, the first elongated hole 288 positioned immediately rearward of the first front-end elongated hole 288*a* will be termed a first center elongated hole 288*c* and the first elongated hole 288 positioned immediately forward of the first rear-end elongated hole 288*b* will be termed a first center elongated hole 288*d*.

The second blade 272 overlaps with the first blade 270 in the up-down direction such that it is positioned below the first blade 270. The second blade 272 comprises a second blade body 296 extending in the front-rear direction, a plurality of second blade edges 298 disposed on both left and right surfaces of the second blade body 296, and a second crank plate 300 connected to a lower disk 64 (see FIG. 4). The second blade body 296 includes a plurality of second elongated holes 302 (four second elongated holes 302 in the present embodiment) having a longitudinal direction along the front-rear direction. The second elongated holes 302 overlap with the first elongated holes 288 in the up-down direction. Hereinafter, the frontmost second elongated hole 302 will be termed a second front-end elongated hole 302*a* and the rearmost second elongated hole 302 will be termed a second rear-end elongated hole 302*b*. Further, the second elongated hole 302 positioned immediately rearward of the second front-end elongated hole 302*a* will be termed a second center elongated hole 302*c* and the second elongated hole 302 positioned immediately forward of the second rear-end elongated hole 302*b* will be termed a second center elongated hole 302*d*.

The first guide member 276 overlaps with the first blade 270 in the up-down direction such that it is positioned above the first blade 270. The second guide member 278 overlaps with the second blade 272 in the up-down direction such that it is positioned below the second blade 272.

The four holding units 80 comprise two first holding units 120 and two second holding units 122. One of the first holding units 120 is inserted in the first front-end elongated hole 288*a* and the second front-end elongated hole 302*a*, while the other first holding unit 120 is inserted in the first center elongated hole 288*c* and the second center elongated hole 302*c*. One of the second holding units 122 is inserted in the first rear-end elongated hole 288*b* and the second rear-end elongated hole 302*b*, while the other second holding unit 122 is inserted in the first center elongated hole 288*d* and the second center elongated hole 302*d*.

Once nuts 132 are screwed to upper portions of corresponding shanks 138 in the four holding units 80, holding parts 136 fix positions of the second blade 272, the first guide member 276, and the second guide member 278 relative to the first blade 270 in the up-down direction. That is, the holding parts 136 hold the first guide member 276, the first blade 270, the second blade 272, and the second guide member 278 overlapping each other in the up-down direction. Inner sleeves 128 are fixedly held between the first guide member 276 and the second guide member 278, while outer sleeves 126 are not fixedly held between the first guide member 276 and the second guide member 278. For the second holding units 122, the second guide member 278 serves as a washer.

Next, operation of the first blade 270 and the second blade 272 is described. In response to the motion (rotation) of an electric motor 32 (see FIG. 3), the first blade 270 and the second blade 272 reciprocate in the front-rear direction with respect to the front end housing 40 (see FIG. 4). In the present embodiment, the front-rear direction is an example of the reciprocating direction. When the first blade 270 moves forward, the second blade 272 moves rearward, whereas when the first blade 270 moves rearward, the second blade 272 moves forward.

During the reciprocation of the first blade 270 and the second blade 272, the outer sleeves 126 guide the first blade 270 and the second blade 272 while contacting inner surfaces of the first elongated holes 288 and the second elongated holes 302. Since the outer sleeves 126 are not fixedly held between the first guide member 276 and the second guide member 278, the outer sleeves 126 rotate around the inner sleeves 128 in conjunction with the reciprocation of the first blade 270 and the second blade 272.

When the first blade 270 and the second blade 272 reciprocate, vibration in the left-right direction is caused in the first blade 270 and the second blade 272. This vibration in the left-right direction becomes larger at positions farther apart from a crank shaft 60 (see FIG. 5), i.e., from rear ends of the first blade 270 and the second blade 272 toward front ends thereof. Thus, the vibration in the left-right direction is maximized near the first front-end elongated hole 288*a* and the second front-end elongated hole 302*a* in the first blade 270 and the second blade 272. Near the first front-end elongated hole 288*a* and the second front-end elongated hole 302*a*, the first blade 270 and the second blade 272 are pressed hard against the outer sleeves 126 due to the vibration in the left-right direction in the first blade 270 and the second blade 272. Even though the first blade 270 and the second blade 272 are pressed hard against the outer sleeves 126, the outer sleeves 126 rotate around the inner sleeves 128, and thus the outer sleeves 126 are less likely to be worn.

(Variants)

In one embodiment, the inner sleeves 128 and the bolts 130 may be integrated with each other.

In one embodiment, the outer sleeve 126 and the inner sleeve 128 may configure a ball bearing or a needle bearing.

In the embodiment above, a holding unit 80 comprises an outer sleeve 126 and an inner sleeve 128, i.e., two sleeves, however, a holding unit 80 may comprise three or more sleeves.

In one embodiment, the working machine 2 may be a lawn clippers.

In one embodiment, the working machine 2 may not comprise the battery pack BP and may operate using electric power supplied from an external power source via an external cable.

In one embodiment, the working machine 2 may not comprise the pair of wheels 10.

In one embodiment, the working machine 2 may comprise an engine instead of the electric motor 32.

What is claimed is:

1. A working machine comprising:
 a prime mover;
 a conversion mechanism configured to move in response to rotation of the prime mover;
 a first blade connected to the conversion mechanism;
 a second blade overlapping with the first blade in an up-down direction; and
 a holding unit configured to hold the first blade and the second blade overlapping each other in the up-down direction,
 wherein
 the first blade is configured to reciprocate in a reciprocating direction perpendicular to the up-down direction with respect to the second blade when the conversion mechanism moves,
 the first blade includes a first elongated hole having a longitudinal direction along the reciprocating direction,
 the second blade includes a second elongated hole having a longitudinal direction along the reciprocating direction,
 the holding unit comprises:
 a holding part inserted in the first elongated hole of the first blade and the second elongated hole of the second blade; and
 an outer sleeve having a cylindrical shape and supported by the holding part such that the outer sleeve is rotatable around the holding part,
 the holding part comprises an inner sleeve inserted in the outer sleeve, an outer circumference surface of the inner sleeve having a circular shape in cross-section, and
 a length of the outer sleeve in the up-down direction is shorter than a length of the inner sleeve in the up-down direction.

2. The working machine according to claim 1, wherein the outer sleeve is disposed in the first elongated hole and the second elongated hole.

3. The working machine according to claim 1, wherein the holding part further comprises:
a bolt comprising a head and supporting the inner sleeve;
a nut screwed to the bolt; and
a washer in which the bolt is inserted, the washer being disposed between the inner sleeve and the head, and
the inner sleeve, the bolt, the nut, and the washer hold the first blade and the second blade overlapping each other in the up-down direction.

4. The working machine according to claim 3, wherein the inner sleeve and the bolt are separate components.

5. The working machine according to claim 1, wherein hardness of the outer sleeve is different from hardness of the inner sleeve.

6. The working machine according to claim 1, wherein a material of the outer sleeve is different from a material of the inner sleeve.

7. A working machine, comprising:
a prime mover;
a conversion mechanism configured to move in response to rotation of the prime mover;
a first blade connected to the conversion mechanism;
a second blade overlapping with the first blade in an up-down direction; and
a holding unit configured to hold the first blade and the second blade overlapping each other in the up-down direction,
wherein
the first blade is configured to reciprocate in a reciprocating direction perpendicular to the up-down direction with respect to the second blade when the conversion mechanism moves,
the first blade includes a first elongated hole having a longitudinal direction along the reciprocating direction,
the second blade includes a second elongated hole having a longitudinal direction along the reciprocating direction,
the holding unit comprises:
a holding part inserted in the first elongated hole of the first blade and the second elongated hole of the second blade; and
an outer sleeve having a cylindrical shape and supported by the holding part such that the outer sleeve is rotatable around the holding part,
wherein
the first elongated hole of the first blade comprises a plurality of first elongated holes arranged along the reciprocating direction,
the second elongated hole of the second blade comprises a plurality of second elongated holes arranged along the reciprocating direction,
the plurality of first elongated holes comprises a first one-end elongated hole disposed at one end of the plurality of first elongated holes in the reciprocating direction,
the plurality of second elongated holes comprises a second one-end elongated hole disposed at one end of the plurality of second elongated holes in the reciprocating direction, the second one-end elongated hole overlapping with the first one-end elongated hole in the up-down direction, and
the holding part is inserted in the first one-end elongated hole and the second one-end elongated hole.

8. The working machine according to claim 7, wherein the holding unit comprises a plurality of holding units,
the plurality of first elongated holes further comprises a first other-end elongated hole disposed at other end of the plurality of first elongated holes in the reciprocating direction,
the plurality of second elongated holes further comprises a second other-end elongated hole disposed at other end of the plurality of second elongated holes in the reciprocating direction, the second other-end elongated hole overlapping with the first other-end elongated hole in the up-down direction,
the holding part of a holding unit of the plurality of holding units is inserted in the first one-end elongated hole and the second one-end elongated hole, and
the holding part of another holding unit of the plurality of holding units is inserted in the first other-end elongated hole and the second other-end elongated hole.

9. The working machine according to claim 2, wherein the holding part further comprises:
a bolt comprising a head and supporting the inner sleeve;
a nut screwed to the bolt; and
a washer in which the bolt is inserted, the washer being disposed between the inner sleeve and the head,
the inner sleeve, the bolt, the nut, and the washer hold the first blade and the second blade overlapping each other in the up-down direction,
the inner sleeve and the bolt are separate components,
hardness of the outer sleeve is different from hardness of the inner sleeve,
a material of the outer sleeve is different from a material of the inner sleeve,
the first elongated hole of the first blade comprises a plurality of first elongated holes arranged along the reciprocating direction,
the second elongated hole of the second blade comprises a plurality of second elongated holes arranged along the reciprocating direction,
the plurality of first elongated holes comprises a first one-end elongated hole disposed at one end of the plurality of first elongated holes in the reciprocating direction,
the plurality of second elongated holes comprises a second one-end elongated hole disposed at one end of the plurality of second elongated holes in the reciprocating direction, the second one-end elongated hole overlapping with the first one-end elongated hole in the up-down direction,
the holding part is inserted in the first one-end elongated hole and the second one-end elongated hole,
the holding unit comprises a plurality of holding units,
the plurality of first elongated holes further comprises a first other-end elongated hole disposed at other end of the plurality of first elongated holes in the reciprocating direction,
the plurality of second elongated holes further comprises a second other-end elongated hole disposed at other end of the plurality of second elongated holes in the reciprocating direction, and the second other-end elongated hole overlapping with the first other-end elongated hole in the up-down direction,
the holding part of a holding unit of the plurality of holding units is inserted in the first one-end elongated hole and the second one-end elongated hole, and the holding part of another holding unit of the plurality of holding units is inserted in the first other-end elongated hole and the second other-end elongated hole.

10. A blade unit to which a motion of a prime mover is transmitted via a conversion mechanism, the blade unit comprising:
   a first blade connected to the conversion mechanism;
   a second blade overlapping with the first blade in an up-down direction; and
   a holding unit configured to hold the first blade and the second blade overlapping each other in the up-down direction,
   wherein
   the first blade is configured to reciprocate in a reciprocating direction perpendicular to the up-down direction with respect to the second blade when the conversion mechanism moves in response to the motion of the prime mover,
   the first blade includes a first elongated hole having a longitudinal direction along the reciprocating direction,
   the second blade includes a second elongated hole having a longitudinal direction along the reciprocating direction,
   the holding unit comprises:
      a holding part inserted in the first elongated hole of the first blade and the second elongated hole of the second blade; and
      an outer sleeve having a cylindrical shape and supported by the holding part such that the outer sleeve is rotatable around the holding part,
   the holding part comprises an inner sleeve inserted in the outer sleeve, an outer circumference surface of the inner sleeve having a circular shape in cross-section, and
   a length of the outer sleeve in the up-down direction is shorter than a length of the inner sleeve in the up-down direction.

11. A blade unit to which a motion of a prime mover is transmitted via a conversion mechanism, the blade unit comprising:
   a first blade connected to the conversion mechanism;
   a second blade overlapping with the first blade in an up-down direction; and
   a holding unit configured to hold the first blade and the second blade overlapping each other in the up-down direction,
   wherein
   the first blade is configured to reciprocate in a reciprocating direction perpendicular to the up-down direction with respect to the second blade when the conversion mechanism moves in response to the motion of the prime mover,
   the first blade includes a first elongated hole having a longitudinal direction along the reciprocating direction,
   the second blade includes a second elongated hole having a longitudinal direction along the reciprocating direction,
   the holding unit comprises:
      a holding part inserted in the first elongated hole of the first blade and the second elongated hole of the second blade; and
      an outer sleeve having a cylindrical shape and supported by the holding part such that the outer sleeve is rotatable around the holding part,
   wherein
   the first elongated hole of the first blade comprises a plurality of first elongated holes arranged along the reciprocating direction,
   the second elongated hole of the second blade comprises a plurality of second elongated holes arranged along the reciprocating direction,
   the plurality of first elongated holes comprises a first one-end elongated hole disposed at one end of the plurality of first elongated holes in the reciprocating direction,
   the plurality of second elongated holes comprises a second one-end elongated hole disposed at one end of the plurality of second elongated holes in the reciprocating direction, the second one-end elongated hole overlapping with the first one-end elongated hole in the up-down direction, and
   the holding part is inserted in the first one-end elongated hole and the second one-end elongated hole.

* * * * *